(12) United States Patent
Koo et al.

(10) Patent No.: US 7,826,136 B2
(45) Date of Patent: Nov. 2, 2010

(54) HIGH RESOLUTION 2D/3D SWITCHABLE DISPLAY APPARATUS

(75) Inventors: Jae-phil Koo, Seoul (KR); Sergey Shestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 11/773,628

(22) Filed: Jul. 5, 2007

(65) Prior Publication Data

US 2008/0037120 A1 Feb. 14, 2008

(30) Foreign Application Priority Data

Aug. 8, 2006 (KR) ............... 10-2006-0074657

(51) Int. Cl.
*G02B 27/22* (2006.01)
(52) U.S. Cl. .................... 359/463; 359/462
(58) Field of Classification Search ............ 359/462, 359/463
See application file for complete search history.

(56) References Cited

U.S. PATENT DOCUMENTS

| 5,606,455 A | 2/1997 | Eichenlaub |
| 5,771,121 A * | 6/1998 | Hentschke ............ 359/463 |
| 5,875,055 A | 2/1999 | Morishima et al. |
| 5,969,850 A | 10/1999 | Harrold et al. |
| 7,271,415 B2 * | 9/2007 | Takechi ................ 257/72 |
| 2005/0057702 A1 | 3/2005 | Cho et al. |

FOREIGN PATENT DOCUMENTS

| EP | 1827032 A2 | 8/2007 |
| JP | 2004325494 A | 11/2004 |

* cited by examiner

*Primary Examiner*—Audrey Y Chang
(74) *Attorney, Agent, or Firm*—Sughrue Mion, PLLC

(57) ABSTRACT

A high resolution 2D/3D switchable display apparatus includes a display panel having display elements arranged in pixel units and configured to display an image. A lenticular lens array includes a plurality of lenticular lenses arranged in a horizontal direction and dividing light corresponding to a signal emitted from the display panel to visual regions of left and right eyes. A spatial optical modulator includes a plurality of cells configured to switch on or off in synchronization with a vertical scanning time of the display panel, wherein each of the plurality of cells is changed to a transparent or opaque state. The display panel sequentially displays an even field including even sequence data of a left eye image and a right eye image and an odd field including odd sequence data of the left eye image and the right eye image.

16 Claims, 14 Drawing Sheets

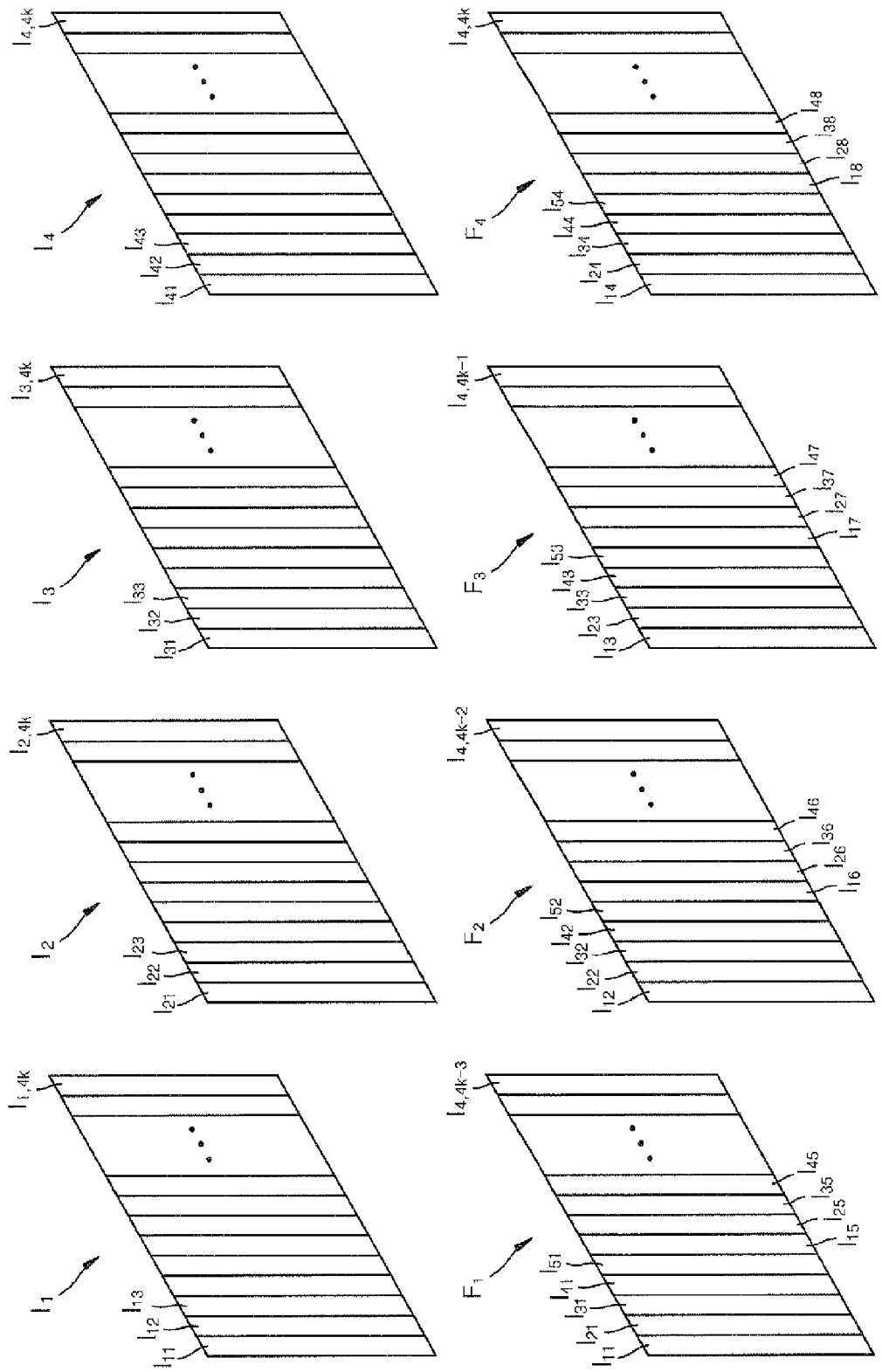

HIGH RESOLUTION 2D/3D SWITCHABLE DISPLAY APPARATUS

CROSS-REFERENCE TO RELATED PATENT APPLICATIONS

This application claims priority from Korean Patent Application No. 10-2006-0074657, filed on Aug. 8, 2006, in the Korean Intellectual Property Office. The priority application is incorporated herein by reference in its entirety.

BACKGROUND OF THE INVENTION

1. Field of the Invention

The present invention relates to a high resolution 2D/3D switchable display apparatus and, more particularly, to a high resolution 2D/3D switchable display apparatus in which a resolution is not lowered and cross-talk decreases.

2. Description of the Related Art 3D image display devices provide an image for a left eye and an image for a right eye having binocular parallax. The images respectively provided to the left eye and the right eye of a user allow the user to view a stereoscopic 3D image.

In conventional methods, visual fields of images for left and right eyes constituting a stereoscopic pair are divided using a parallax barrier or a lenticular lens. In this case, the two images constituting the stereoscopic pair are displayed on sets of different columns of a single panel. For example, the image for the left eye is displayed on odd columns and the image for the right eye is displayed on even columns. However, since the images for the left and right eyes are simultaneously displayed by a single display panel, the resolution of each of the images viewed by a user is reduced to ½ of the original resolution of the display panel.

In order to keep a resolution of images as the original resolution of the display panel, the images for the left and right can be alternately displayed over the whole display panel.

FIG. 1 schematically illustrates a conventional stereoscopic display apparatus 20, which is disclosed in U.S. Pat. No. 5,969,850. Referring to FIG. 1, the stereoscopic display apparatus 20 includes a backlight unit 21, a spatial light modulator 22, a lenticular lens array 23, and a high speed responsive liquid crystal display panel 26. The spatial light modulator 22 is formed of a plurality of cells 24 and 25 that switch between a transparent state and an opaque state according to an applied signal. In the stereoscopic display apparatus 20, the high speed responsive LCD display panel 26 alternately displays, at high speed, the images for the left and right eyes over the whole screen of the high speed responsive LCD display panel 26. The spatial light modulator 22 switches the cells 24 and 25 in synchronization with the switching of the left and right images displayed on the high speed responsive LCD display panel 26. For example, while the high speed responsive LCD display panel 26 displays the images for the left eye, the spatial light modulator 22 turns on the left eye cells 24 so that the light emitted from the backlight unit 21 is directed only towards a left eye viewing zone 28 of a user. Also, while the high speed responsive LCD display panel 26 displays the right eye image, the spatial light modulator 22 turns on the right eye cells 25 so that the light emitted from the backlight unit 21 is directed only towards a right eye viewing zone 27 of the user. In a conventional 2-D mode, all the cells 24 and 25 of the spatial light modulator 22 are turned on.

However, as in the above described prior art, when the left eye and right eye cells 24 and 25 of the spatial light modulator 22 are simply turned on and off in alternation, cross-talk is generated between the image for the left eye and the image for the right eye so that the user is not able to view an accurate 3-D image.

In general, most display panels sequentially scan an image of a frame from the top of a screen to the bottom. While an image of a previous frame is still displayed on the lower portion of the screen, an image of the next frame is displayed on the upper portion of the screen. For example, when the time for a complete scanning of a frame is T, as illustrated in FIG. 2, a right eye image corresponding to an image at time "0" is displayed in the whole screen at a time "0" and a left eye image corresponding to an image at a time "T" is displayed in the whole screen at a time "T". However, since the right eye image corresponding to an image at a time "0" is gradually changed into the left eye image which corresponds to an image at a time "T", the left eye image is displayed on the upper portion of the screen while the right eye image is still displayed on the lower portion of the screen, between time "0" and "T". As a result, cross-talk is generated between the image for the left eye and the image for the right eye.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In one aspect, the present invention relates to a high resolution 2D/3D switchable display apparatus including a display panel having display elements arranged in pixel units and configured to display an image, a lenticular lens array including a plurality of lenticular lenses arranged in a horizontal direction and dividing light emitted from the display panel to visual regions of left eye and right eye, and a spatial optical modulator including a plurality of cells configured to switch on or off in synchronization with a vertical scanning time of the display panel. Each of the plurality of cells is changed to a transparent or opaque state. The display panel sequentially displays an even field including even sequence data of a left eye image and a right eye image and an odd field including odd sequence data of an image for the left eye and an image for the right eye.

In another aspect, the present invention relates to a high resolution 2D/3D switchable display apparatus including a display panel that includes display elements arranged in pixel units and configured to display an image. A lenticular lens array includes a plurality of lenticular lenses arranged in a horizontal direction and dividing light emitted from the display panel to first through Nth visual regions, wherein N is a natural number greater than 2. A spatial optical modulator includes a plurality of cells configured to switch on or off in synchronization with a vertical scanning time of the display panel. Each of the plurality of cells is changed to a transparent or opaque state. The display panel sequentially displays a first field including (N×k−(N−1)) sequence data of first through Nth visual region images, a second field including (N×k−(N−2)) sequence data of first through Nth visual region images, . . . , and a Nth field comprising (N×k−(N−N)) sequence data of first through Nth visual region images, where k is any one of 1, 2, 3.

BRIEF DESCRIPTION OF THE DRAWINGS

The above and other features and advantages of the present invention will become more apparent by describing in detail exemplary embodiments thereof with reference to the attached drawings in which:

FIG. 9 illustrates image data, used to display a three dimensional image in a multiview manner, including first through fourth fields, in accordance with an embodiment of the present invention.

DETAILED DESCRIPTION OF EXEMPLARY EMBODIMENTS OF THE INVENTION

Figure 1:
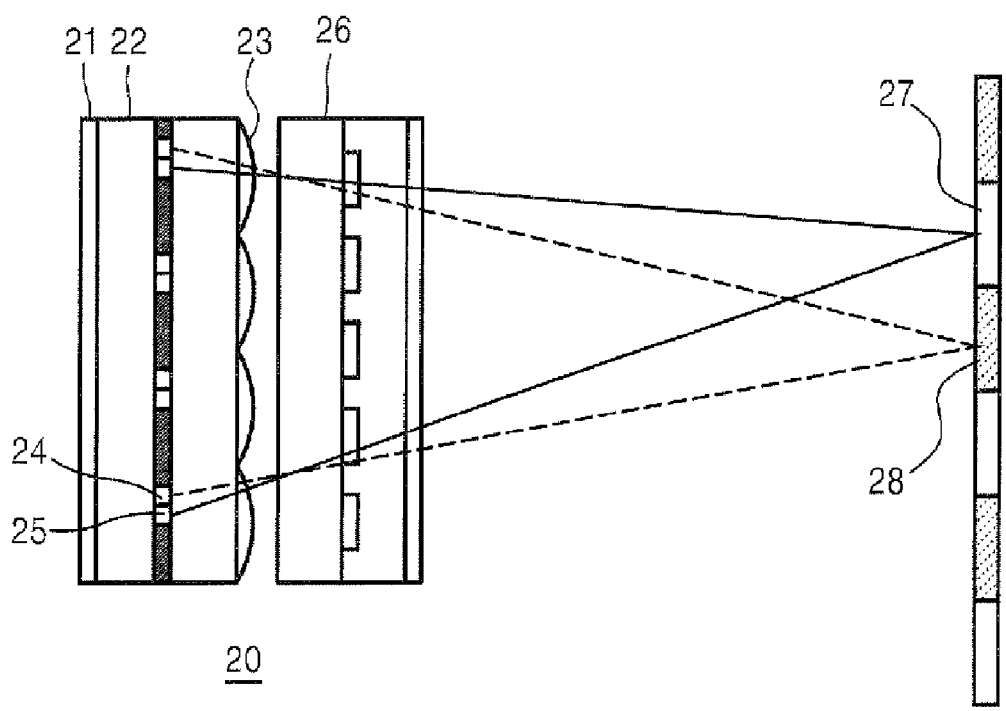
FIG. 1 schematically illustrates a prior art stereoscopic display apparatus.
Figure 2:
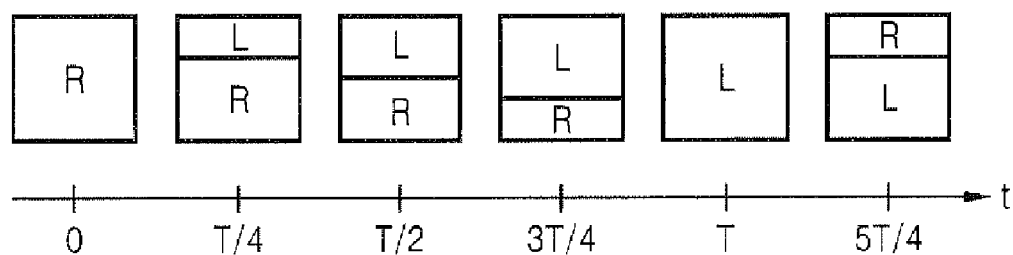
FIG. 2 illustrates a prior art step of scanning images for the left and right eyes in a display panel.

Exemplary embodiments of the present invention will now be described more fully with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted. In the drawings, the thickness of layers and region are exaggerated for clarity.

Figure 3:
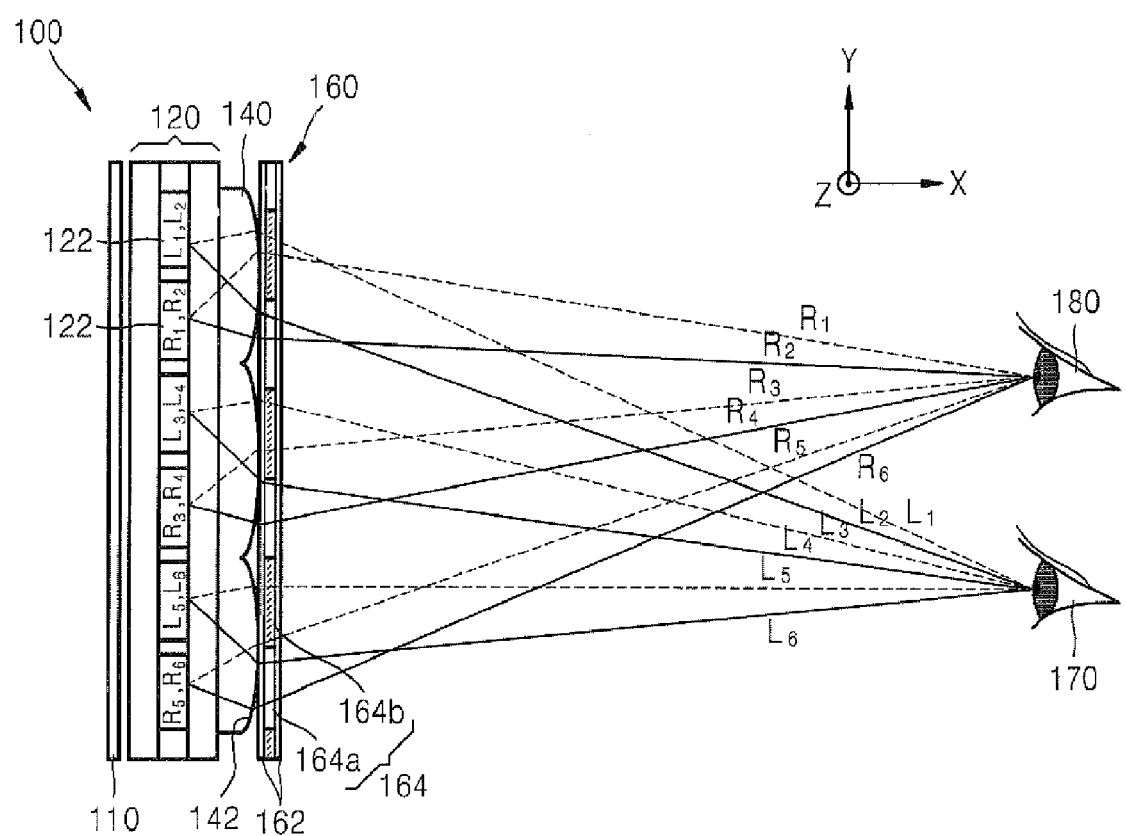
FIG. 3 is a schematic view illustrating a display apparatus in accordance with an embodiment of the present invention.

FIG. 3 is a schematic view illustrating a display apparatus 100 in accordance with an embodiment of the present invention. Referring to FIG. 3, the display apparatus 100 includes a display panel 120, a lenticular lens array 140 dividing light emitted from the display panel 120 to visual regions of left and right eyes 170 and 180 of a viewer, and a spatial optical modulator 160 operating in synchronization with the display panel 120. The display panel 120 includes a plurality of pixels 122. Each of the plurality of pixels 122 includes a display element for emitting light. The display element may be a self-emitting display element, such as an organic light emitting diode (OLED), a field emitting diode (FED), and the like, or a passive display element, such as a liquid crystal display (LCD). In an exemplary embodiment in which the display element is a passive display element, a backlight unit 110 may be formed on the rear of the display panel 120 as illustrated in FIG. 3. In an exemplary embodiment in which the display panel 120 is the self-emitting display element, the backlight unit 110 is not required. The pixels 122 are arranged in an array of horizontal and vertical lines. Pixels of a single vertical line emit light for forming an image for one of a left eye or right eye. Alternate pixels arranged in the horizontal line display images for a left eye and a right eye and so on. The vertical and horizontal directions are each defined according to the vision of a viewer. The vertical direction is a Z direction. The horizontal direction is a Y direction. The lenticular lens array 140 includes a plurality of lenticular lenses 142 arranged in the horizontal direction. Each of the plurality of lenticular lenses 142 is formed to cover two pixels 122 of the display panel 120, and divides light emitted by each of the pixels 122 to visual fields of either left or right eyes 170 or 180 accordingly.

Continuing with FIG. 3, the spatial optical modulator 160 may be a high speed responsive liquid crystal display panel. In such an exemplary embodiment, the modulator 160 may include two substrates 162 and a plurality of cells 164 filled with a liquid crystal. In order to decrease cross-talk, the substrate 162 may be formed sufficiently thin. The substrate 162 may be formed of polyimide, polyethersulphone, polyethylene terephthalate and a resin-based material, which are flexible and transparent. Each of the lenticular lenses 142 corresponds to two cells 164a and 164b. A pitch between the cells 164a and 164b is half, or slightly less than half, of pitch between the lenticular lenses 142. The plurality of the cells 164a and 164b are switched on or off in synchronization with a vertical scanning time of the display panel 120. Each of the plurality of the cells 164a and 164b is changed to be transparent or opaque. That is, when the cells 164a of a left side of each of the lenticular lenses 142 is transparent and the cells 164b of a right side of each of the lenticular lenses 142 is opaque, light emitted from the display panel 120 follows along a path shown as a solid line to arrive on the left eye 170 and the right eye 180 thorough left half parts of the lenticular lenses 142 as illustrated in FIG. 3. On the other hand, when the cells 164b of a right side of each of the lenticular lenses 142 are transparent, light emitted from the display panel 120 follows along a path shown as a dotted line to arrive on the left eye 170 and the right eye 180 through right half parts of the lenticular lenses 142.

Referring to FIGS. 4 through 8B, a display apparatus 100 displays a three dimensional image and a two dimensional image as follows.

Figure 4:
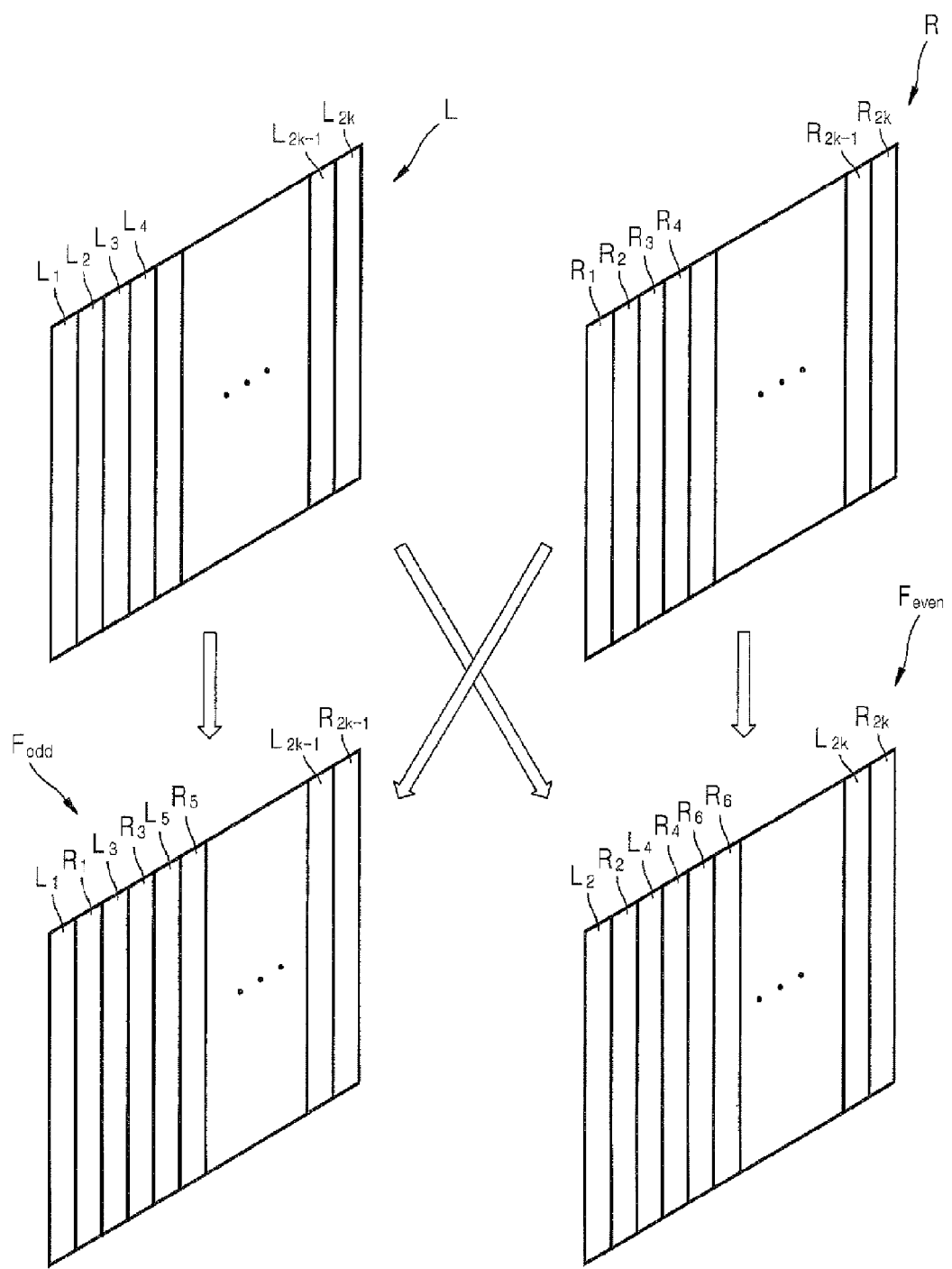
FIG. 4 illustrates image data, used in a display panel for displaying a three dimensional image, including an odd field and an even field, in accordance with an embodiment of the present invention.

FIG. 4 illustrates image data used in a display panel 120 for displaying a three dimensional image, including an odd field $F_{odd}$ and an even field $F_{even}$, in accordance with an embodiment of the present invention. Referring to FIG. 4, a left eye image L and a right eye image R are prepared to display the three dimensional image. Then, the odd field $F_{odd}$ and the even field $F_{even}$ are constructed using the left eye image L and the right eye image R. The odd field $F_{odd}$ includes a combination of data of odd vertical lines (L1, L3 . . . ) of the left eye image L and data of odd vertical lines (R1, R3 . . . ) of the right eye image R. The even field $F_{even}$ includes a combination of data of even vertical lines (L2, L4, . . . ) of the left eye image L and data of even vertical lines (R2, R4, . . . ) of the right eye image R. That is, the odd field $F_{odd}$ and the even field $F_{even}$ each include a half of the left eye image L and a half of the right eye image R.

Figure 5A:
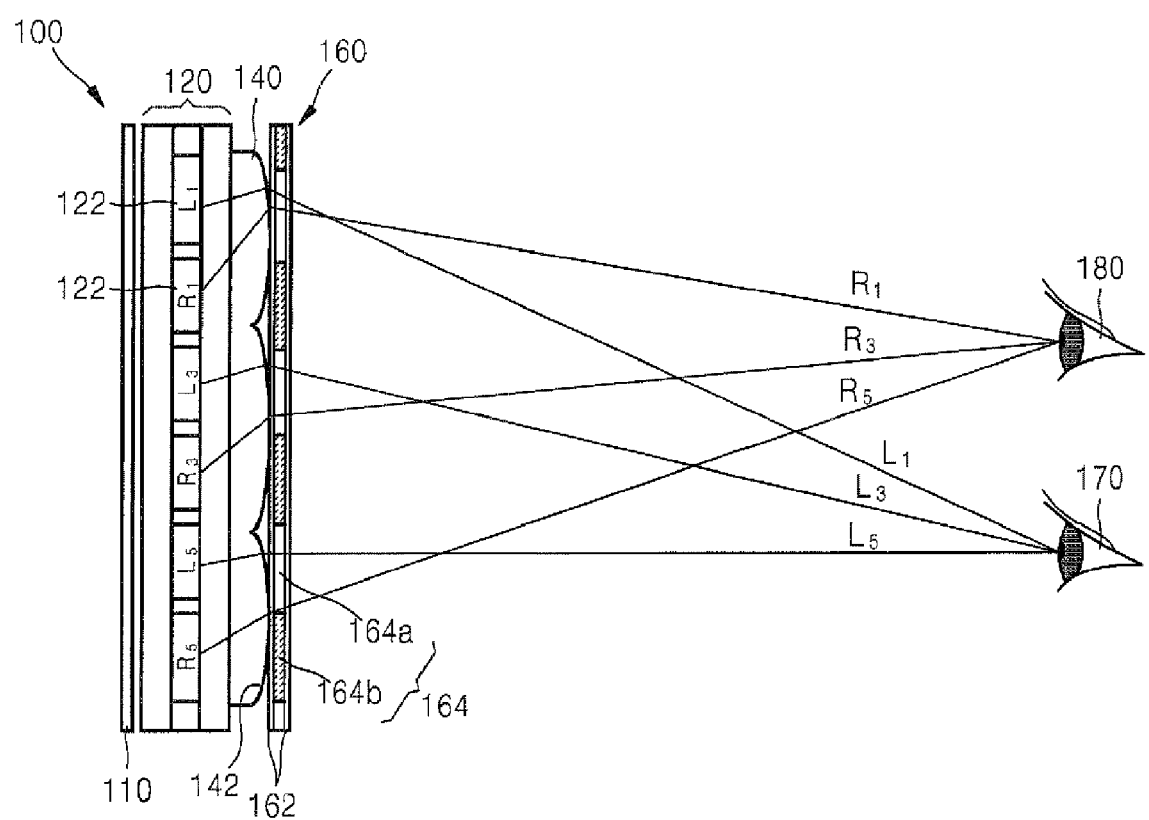
FIGS. 5A and 5B illustrate a three dimensional image being sensed when a display panel displays images of an odd field and an even field, respectively, in accordance with an embodiment of the present invention.
Figure 5B:
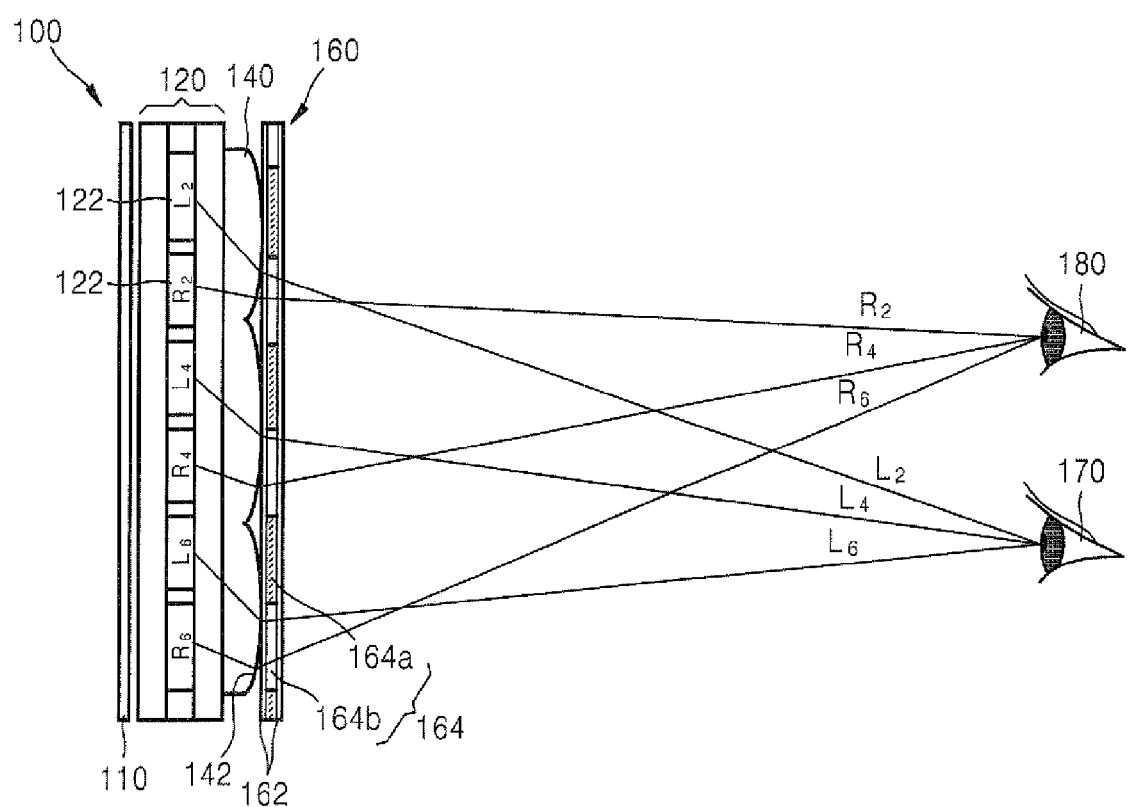

FIGS. 5A and 5B illustrate a three dimensional image being sensed when a display panel displays images of an odd field $F_{odd}$ and an even field $F_{even}$, respectively, in accordance with two embodiments of the present invention. Referring to FIGS. 5A and 5B, cells 164a and 164b of a spatial optical modulator 160 are switched on or off in synchronization with a vertical scanning time of a display panel 120. Cells that are switched off (i.e. an opaque state) are shown containing slashes. Referring to FIG. 5A, when the display panel 120 displays an image of the odd field $F_{odd}$, the cells 164a corresponding to right half parts of the lenticular lenses 142 are switched on. Then, light corresponding to the odd field $F_{odd}$ signal is emitted through the lenticular lenses 142 and passes through the cells 164a. The lenticular lenses 142 divide and transmit the light corresponding to the odd field $F_{odd}$ signal emitted from the display panel 120 so that the light for forming the image for the left eye L and the light for forming the image for the right eye R arrive at the left eye 170 and the right eye 180, respectively. The odd sequence data (L1, L3 . . . ) of left eye image L and the odd sequence data (R1, R3 . . . ) of the right eye image R are sensed by the left eye 170 and the right eye 180, respectively, and together are sensed to be a three dimensional image.

Referring to FIG. 5B, when the display panel 120 displays an image of the even field $F_{even}$, the cells 164b corresponding to left half parts of the lenticular lenses 142 are switched on to be transparent. Then, light corresponding to the even field $F_{even}$ signal is emitted through the lenticular lenses 142 and passes through the cells 164b. The lenticular lenses 142 divide and transmit the light corresponding to the even field $F_{even}$ signal emitted from the display panel 120 so that the light for forming the left eye image L and the light for forming the right eye image R arrive at the left eye 170 and the right eye 180, respectively. The even sequence data (L2, L4, . . . ) of the left eye image L and the even sequence data (R2, R4, . . . ) of right eye image R are sensed by the left eye 170 and the right eye 180, respectively, and together are sensed to be a three dimensional image.

Figure 6:
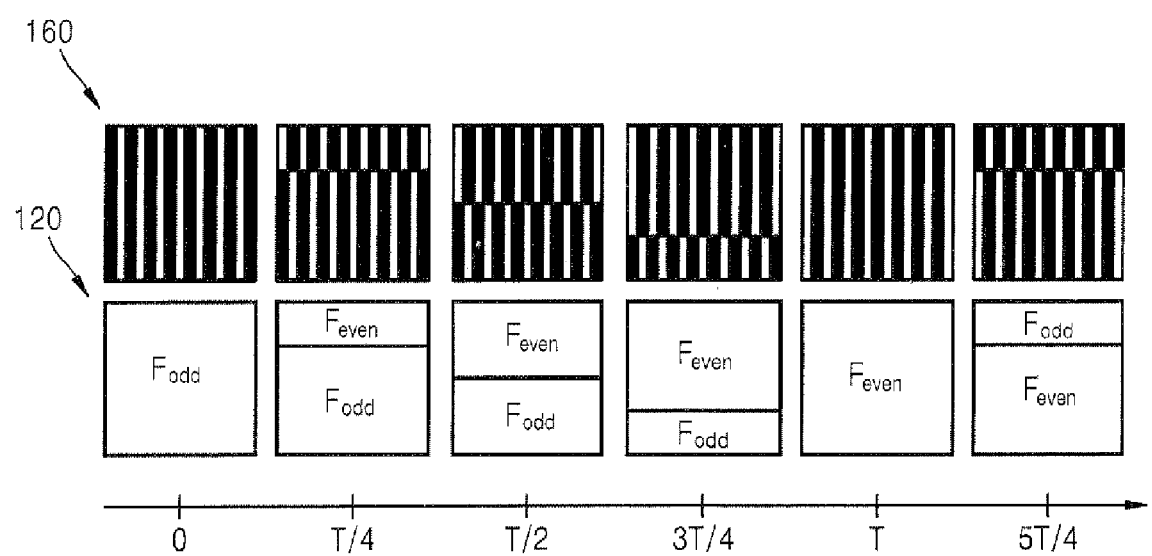
FIG. 6 illustrates operations when a display panel scans odd field images and even field images, in accordance with an embodiment of the present invention.

FIG. 6 illustrates the operations when the display panel 120 scans a partial image for the left eye and an image for the right eye in each field, in accordance with an embodiment of the present invention. The images of the odd field $F_{odd}$ and the even field $F_{even}$ are alternately displayed with a period T. The cells 164a and 164b of the spatial optical modulator 160 are appropriately switched on or off in synchronization with a vertical scanning time of the display panel 120. The image of the odd field $F_{odd}$ signal is displayed through right half parts of the lenticular lenses 142 at about half the resolution of the display panel 120. The image of the even field $F_{even}$ signal is displayed through left half parts of the lenticular lenses 142 at about half the resolution of the display panel 120. Here, when the period T is relatively short compared to the sensitivity of human eyes, the image of the two fields $F_{odd}$ and $F_{even}$ can be sensed at the full resolution of the display panel 120. Because a frequency of a blink of human eyes is about 120 Hz, the period T should be shorter than 1/120 second.

Figure 7:
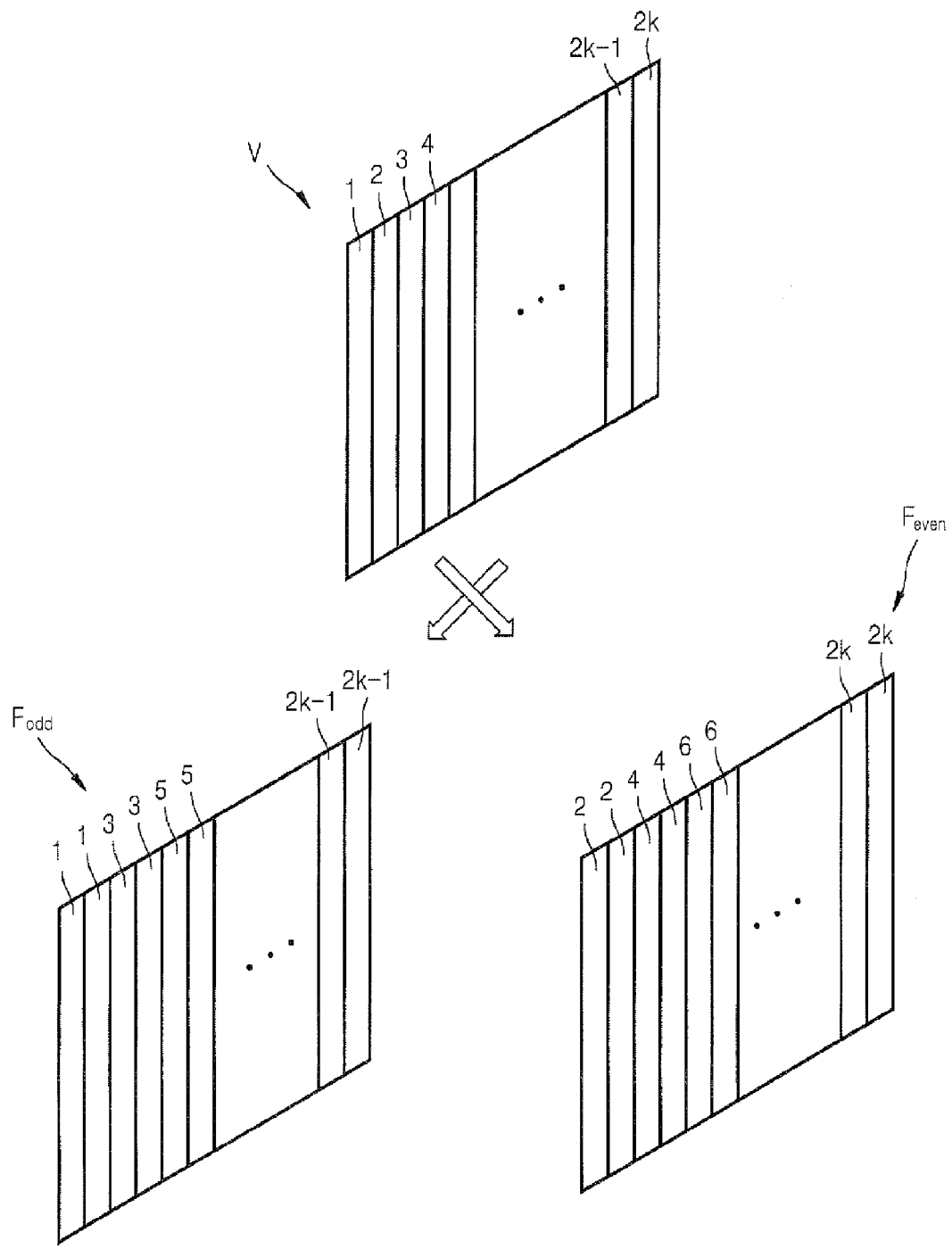
FIG. 7 illustrates a distribution of image data for a two dimensional image, in accordance with an embodiment of the present invention.
Figure 8A:
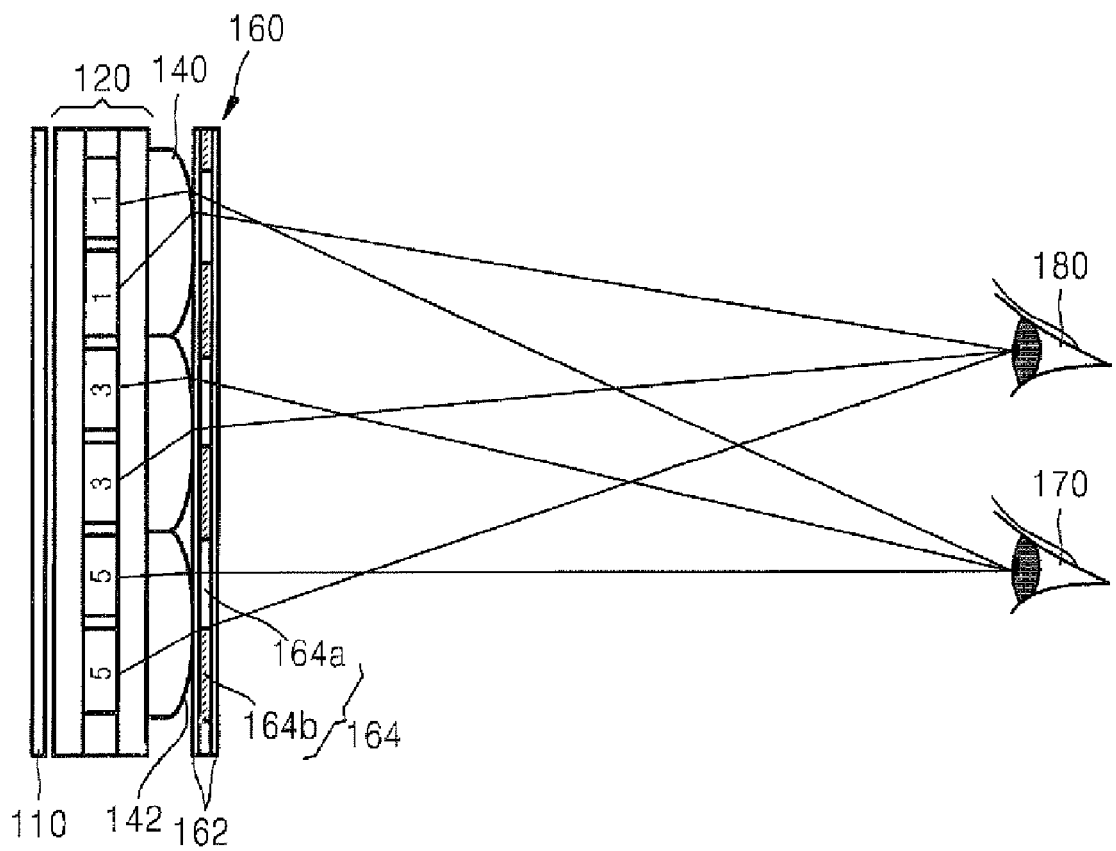
FIGS. 8A and 8B illustrate the cases when a display panel displays images of the odd field and the even field for a two dimensional image.
Figure 8B:
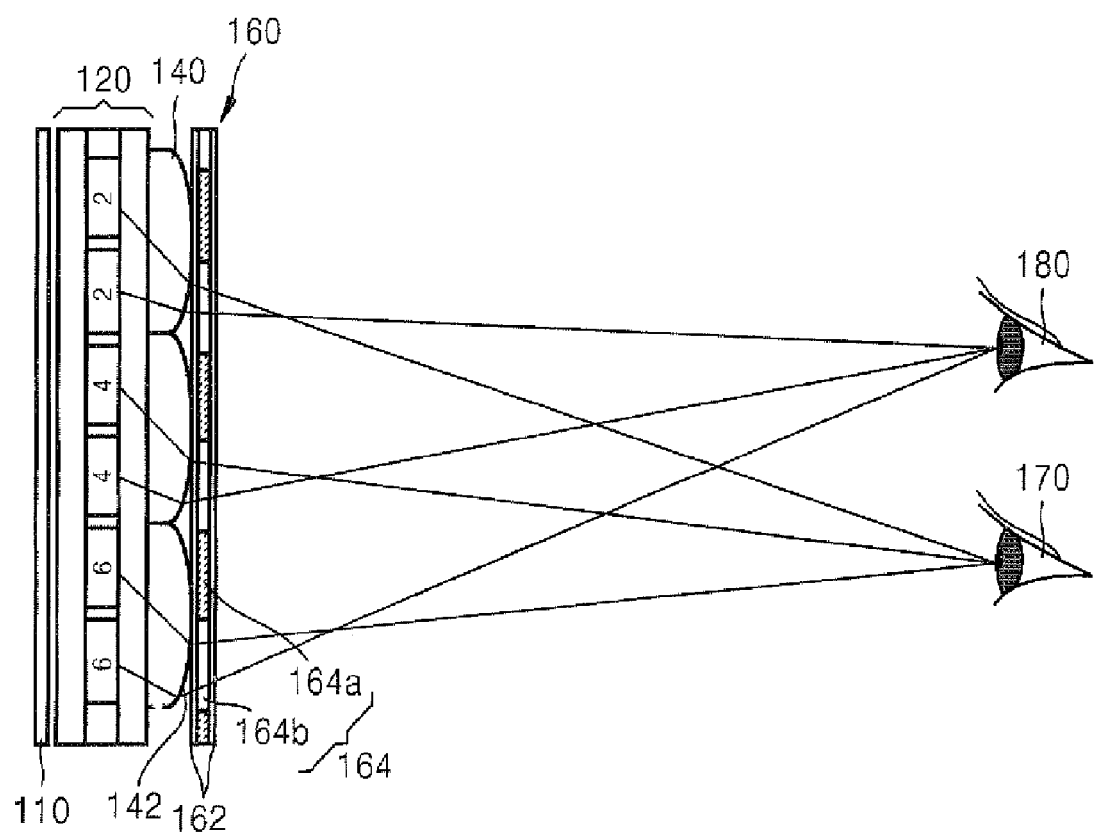

FIG. 7 illustrates a distribution of image data for a two dimensional image, in accordance with an embodiment of the present invention. Referring to FIG. 7, the image data includes an odd field $F_{odd}$ and an even field $F_{even}$. In the odd field $F_{odd}$, odd sequence data of the one two dimensional image V are each arranged twice. In the even field $F_{even}$, even sequence data of the one two dimensional image V are each arranged twice. FIGS. 8A and 8B illustrate the cases when a display panel 120 displays images of the odd field $F_{odd}$ and the even field $F_{even}$. In both FIGS. 8A and 8B, the images respectively sensed by right eye and left eye are the same, thereby providing two dimensional images to the viewer.

In another exemplary embodiment, a display apparatus may be a multiview type display apparatus having N views. The multiview type is a type in which different images are sensed according to views and thus providing a three dimensional image. Hereinafter, N is 4, but may be any plural number.

FIG. 9 illustrates image data, used to display a three dimensional image in a multiview manner, including first through fourth fields $F_1$, through $F_4$, in accordance with an embodiment of the present invention. Referring to FIG. 9, first through fourth visual region images $I_1$ though $I_4$ are prepared. Then, first through fourth fields $F_1$ through $F_4$ are constructed using the first through fourth visual region images $I_1$ though $I_4$. The first field $F_1$ includes a combination of (4k−3) sequence data ($I_{11}, I_{15}, I_{19}, \ldots$) of the first visual region image $I_1$, (4k−3) sequence data ($I_{21}, I_{25}, I_{29}, \ldots$) of the second visual region image $I_2$, (4k−3) sequence data ($I_{31}, I_{35}, I_{39}, \ldots$) of the third visual region image $I_3$, and (4k−3) sequence data ($I_{41}, I_{45}, I_{49}, \ldots$) of the fourth visual region image $I_4$. The second field $F_2$ includes a combination of the (4k−2) sequence data of the first through fourth visual region images $I_1$ though $I_4$. The third field $F_3$ includes a combination of the (4k−1) sequence data of the first through fourth visual region images $I_1$ though $I_4$. The fourth field $F_4$ includes a combination of the 4k sequence data of the first through fourth visual region images $I_1$ though $I_4$. Here, k is any one of 1, 2, 3 . . . That is, the first through fourth fields $F_1$ through $F_4$ are respectively constructed by combining ¼ of each of the first through fourth visual region $I_1$ through $I_4$.

FIGS. 10A through 10D are diagrams of a display apparatus 300 in accordance with an embodiment of the present invention. That is, FIGS. 10A through 10D illustrate three dimensional images being sensed when images of first through fourth fields $F_1$ through $F_4$ are displayed, respectively. The display apparatus 300 includes a display panel 320, a lenticular lens array 340 dividing light emitted from the display panel 320 to first through fourth visual regions 381 through 384, and a spatial optical modulator 360 switching on or off in synchronization with the display panel 320. The display panel 320 includes a plurality of pixels 322. Each of the pixels includes a display element emitting light. The display element may be a self-emitting display element such as an OLED, a FED, and the like, or a passive display element, such as a liquid crystal display. In an exemplary embodiment in which the display element is a passive display element, a backlight unit 310 may be formed on the rear of the display panel 320, as illustrated in FIGS. 10A through 10D. In an exemplary embodiment in which the display panel 320 is a self-emitting display element, the backlight unit 310 is not required. Pixels of a single vertical line emit light for forming an image for one of a first through fourth visual region images $I_1$ through $I_4$. Alternate pixels arranged in the horizontal line emit light for forming an image for the first visual region image $I_1$, the second visual region image $I_2$, the third visual region image $I_3$, and the fourth visual region image $I_4$, and so on. The vertical and horizontal directions are each defined according to the vision of a viewer. The vertical direction is a Z direction. The horizontal direction is a Y direction. The lenticular lens array 340 includes a plurality of lenticular lenses 342 arranged in the horizontal direction. The modulator 360 includes a plurality of cells 364. Each of the lenticular lenses 342 corresponds to four cells 364a through 364d. A pitch between the adjacent two cells of cells 364a through 364d is quarter, or slightly less than quarter, pitch between the lenticular lenses 342. The plurality of the cells 364a through 364d are switched on or off in synchronization with a vertical scanning time of the display panel 220. Each of the plurality of the cells 364a through 364d is changed to be transparent or opaque.

Figure 10A:
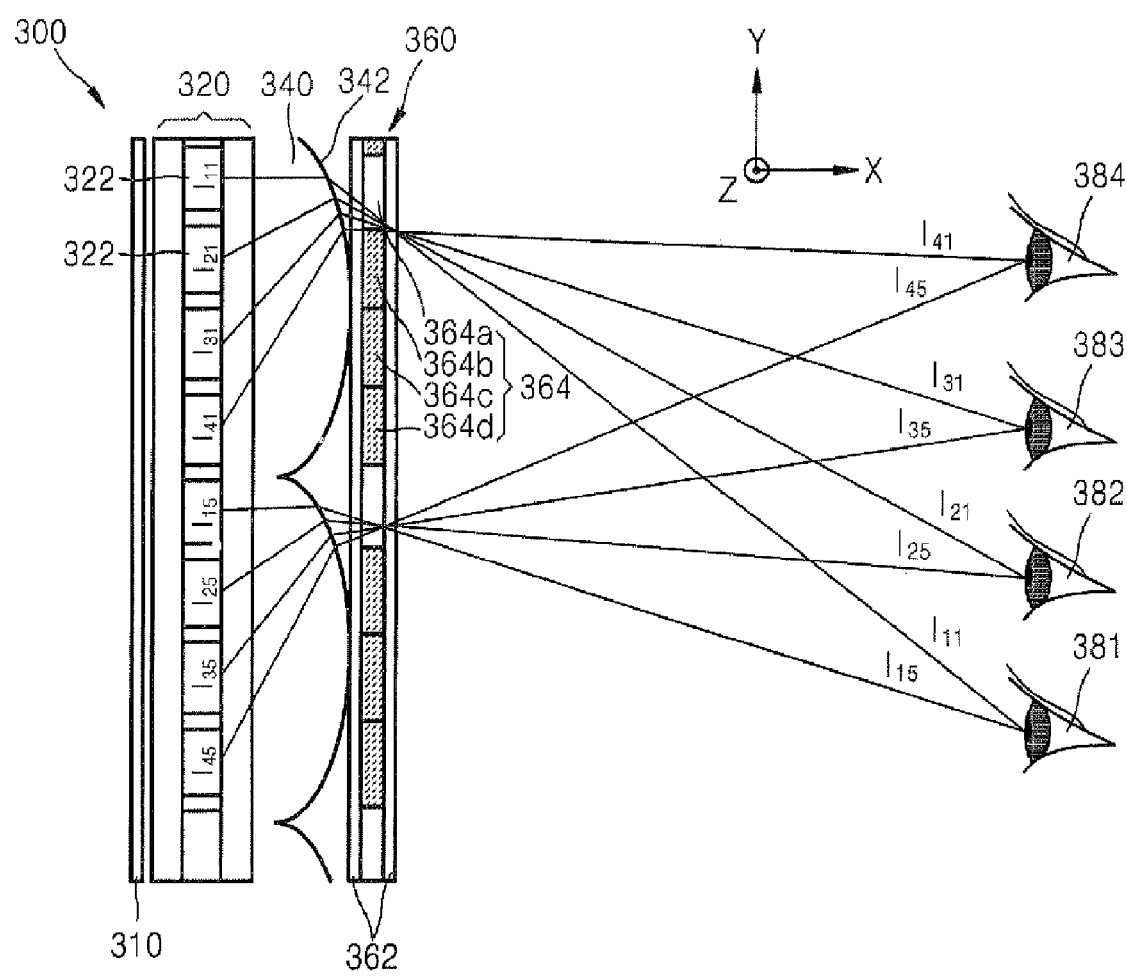
FIGS. 10A through 10D illustrate a three dimensional image being sensed when a display panel displays image data of first through fourth fields, in accordance with an embodiment of the present invention.

FIG. 10A illustrates the case when the display panel 320 displays image data corresponding to the first field $F_1$. When the display panel 320 displays the first field $F_1$, rightmost cells 364a of cells 364a through 364d facing each of the lenticular lenses 342 are switched on to be transparent. Then, the first field $F_1$ signal is emitted through the lenticular lenses 342 and the cells 364a. The lenticular lenses 342 divides light corresponding to the first field $F_1$ signal emitted from the display panel 320 so that first visual region images ($I_{11}, I_{15}, I_{19}, \ldots$), second visual region images ($I_{21}, I_{25}, I_{29}, \ldots$), third visual region images ($I_{31}, I_{35}, I_{39}, \ldots$) and fourth visual region images ($I_{41}, I_{45}, I_{49}, \ldots$) arrive at a first visual region 381, a second visual region 382, a third visual region 383 and a fourth visual region 384, respectively. Since different images arrive at the first through fourth visual regions 381 through 384, respectively, a three dimensional image is sensed.

Figure 10B:
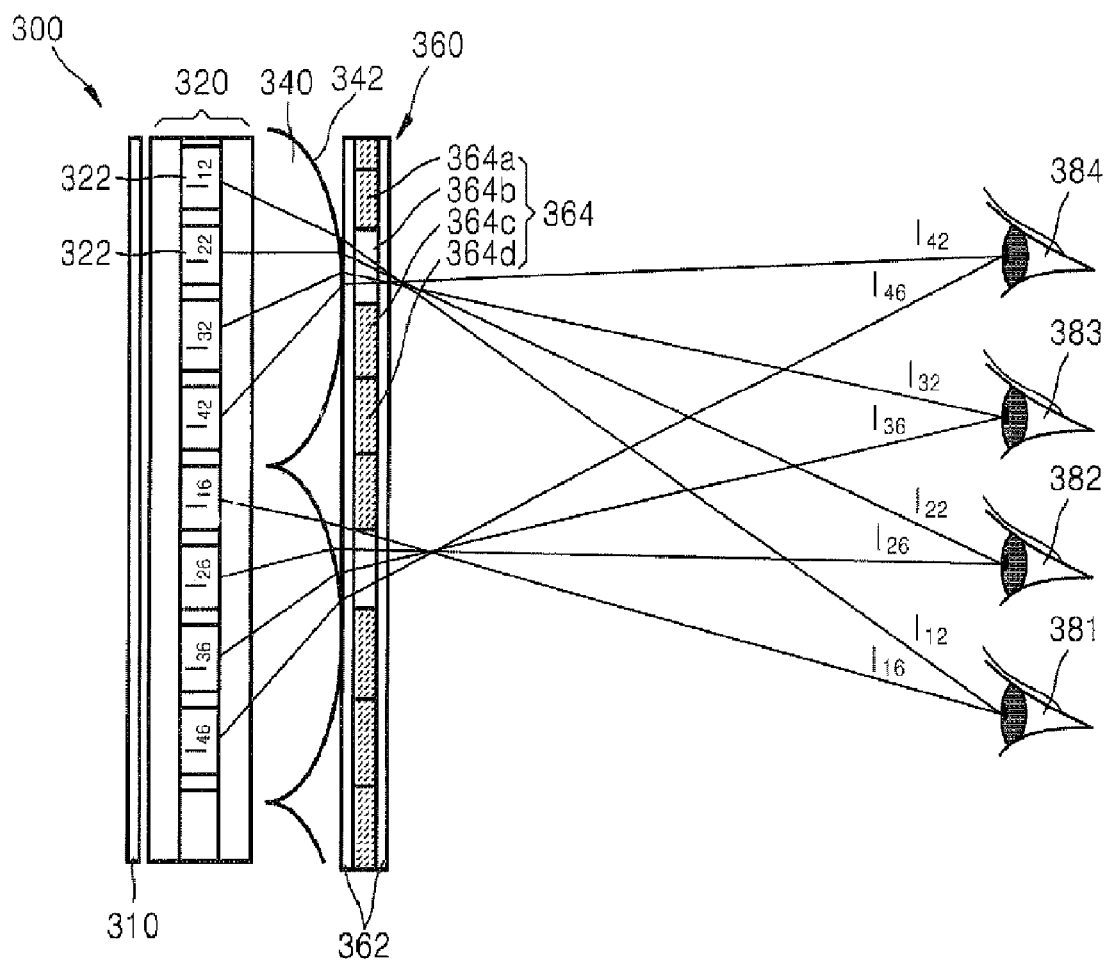

FIG. 10B illustrates the case when the display panel 320 displays image data corresponding to the second field $F_2$. When the display panel 320 displays the second field $F_2$, second cells 364b from the rightmost of cells 364a through 364d facing each of the lenticular lenses 342 are switched on. Then, the second field $F_2$ signal is emitted through the lenticular lenses 342 and the cells 364b. Since first through fourth visual region images $I_{1,4k-2}$ through $I_{4,4k-2}$ arrive at first through fourth visual region 381 through 384, a three dimensional image is sensed.

Figure 10C:
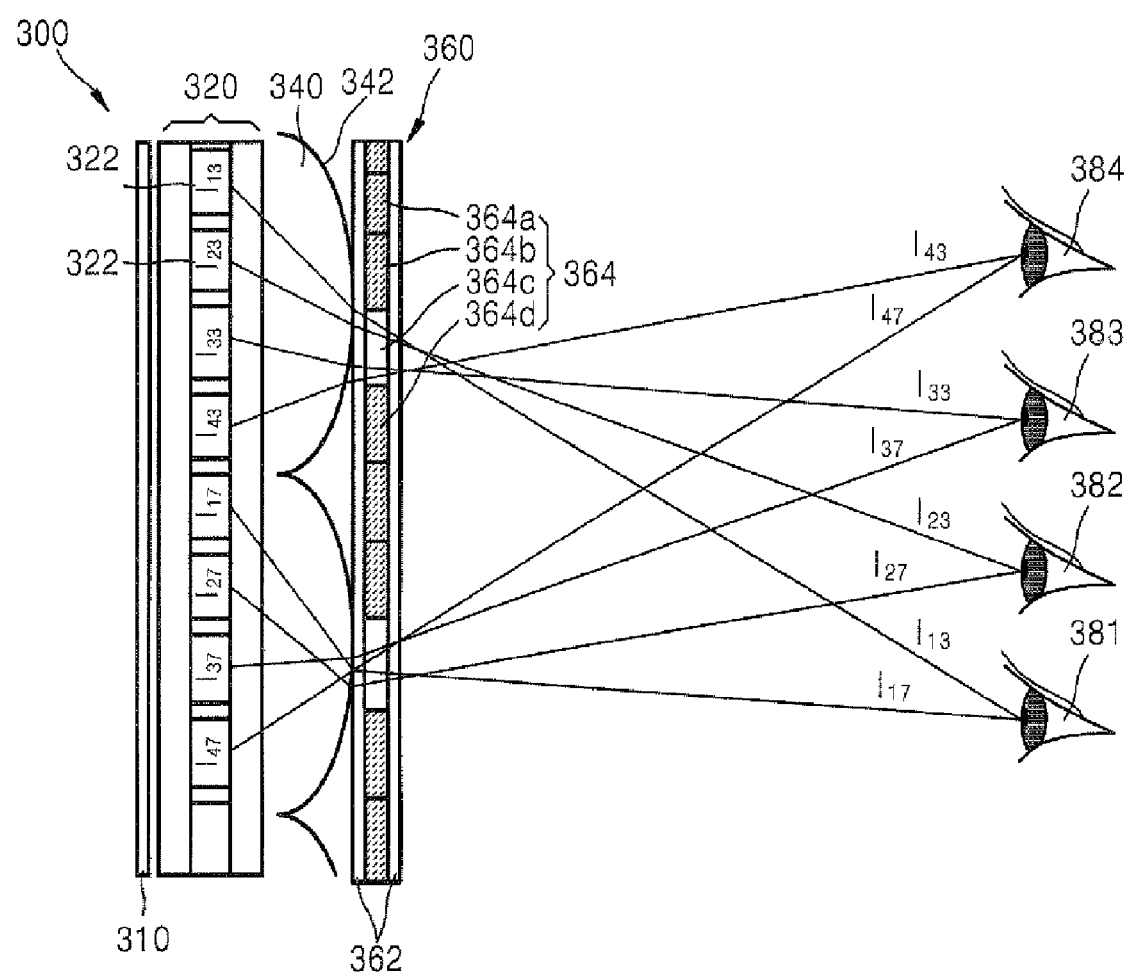
Figure 10D:
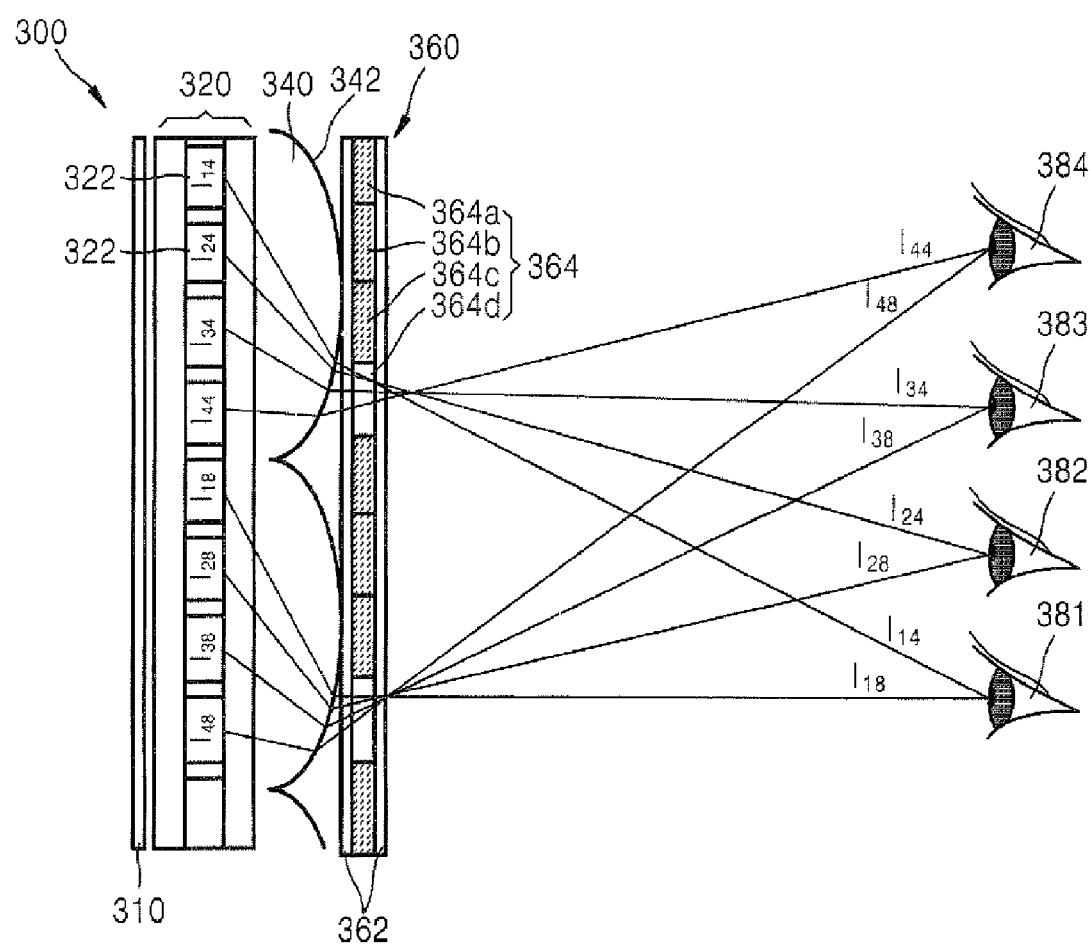

FIGS. 10C and 10D illustrate the cases when the display panel 320 displays image data corresponding to the third field $F_3$ and fourth field $F_4$, respectively. In the respective cases illustrated in FIGS. 10C and 10D, third cells 364c and fourth cells 364d from the rightmost of cells 364a through 364d facing each of the lenticular lenses 342 are switched on to be transparent. Since first through fourth visual region images $I_{1,4k-3}$ through $I_{4,4k-3}$ and $I_{1,4k}$ through $I_{4,4k}$ arrive at first through fourth visual regions 381 through 384, a three dimensional image is sensed. The case, when the display apparatus 300 displays a two dimensional image is the substantially same as that of FIG. 7, and thus, a detailed description of the case will be omitted.

In the above described exemplary embodiments, the number of visual regions is 4, but is not limited thereto. That is, the number of visual regions may be N. In this case, a display apparatus includes a lenticular lens array which divides a signal emitted from a display panel to N (where, N>2) visual regions, that is, first through N visual regions. The display panel sequentially display a first field including (N×k−(N−1)) sequence data of first through Nth visual regions, a second field including (N×k−(N−2)) sequence data of first through Nth visual regions, . . . , and a Nth field including (N×k−(N−N)) sequence data of first through Nth visual regions. Here, k is any one of 1, 2, 3 . . .

In accordance with an embodiment of the present invention, a high resolution 2D/3D switchable display apparatus includes a lenticular lens array that divides light corresponding to image signals to left and right eyes and a display panel alternately displaying even and odd field images, in which a resolution is not lowered and cross-talk is prevented. In addition, the high resolution 2D/3D switchable display apparatus may further include various display elements, such as a self-emitting display element, and the like, and the display apparatus may be easily compatible with displaying a multiview stereoscopic image. Because the high resolution 2D/3D switchable display apparatus has a simple structure, it can be manufactured using an inexpensive method and can be mass produced.

Although the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A high resolution 2D/3D switchable display apparatus comprising:
   a display panel comprising display elements arranged in pixel units and configured to display an image;
   a lenticular lens array comprising a plurality of lenticular lenses arranged in a horizontal direction and dividing light emitted from the display panel to visual regions of a left eye and a right eye; and
   a spatial optical modulator comprising a plurality of cells configured to switch on or off in synchronization with a vertical scanning time of the display panel, wherein each of the plurality of cells is changed to a transparent or opaque state,
   wherein the display panel is configured to sequentially display an even field comprising even sequence data of an image for the left eye and an image for the right eye and an odd field comprising odd sequence data of the image for the left eye and the image for the right eye.

2. The apparatus of claim 1, wherein a pitch between each of the plurality of cells measured in a horizontal direction is no more than about half a pitch between the lenticular lenses.

3. The apparatus of claim 1, wherein each of the plurality of lenticular lenses corresponds to two vertical lines of pixel units.

4. The apparatus of claim 1, wherein the spatial optical modulator is a liquid crystal display panel.

5. The apparatus of claim 4, wherein a substrate of the liquid crystal display panel is a flexible substrate.

6. The apparatus of claim 5, wherein the flexible substrate is formed of any one selected from polyimide, polyethersulfone, polyethyleneterephtalate, and resin.

7. The apparatus of claim 1, wherein the display element is a self-emissive display element.

8. The apparatus of claim 1, wherein the display element is a non-emissive display element, and the display panel further comprises a backlight unit disposed at a rear of the display panel.

9. A high resolution 2D/3D switchable display apparatus comprising:
   a display panel comprising display elements arranged in pixel units and configured to display an image;
   a lenticular lens array comprising a plurality of lenticular lenses arranged in a horizontal direction and dividing light emitted from the display panel to first through Nth visual regions, wherein N is a natural number greater than 2; and
   a spatial optical modulator comprising a plurality of cells configured to switch on or off in synchronization with a vertical scanning time of the display panel, wherein each of the plurality of cells is changed to a transparent or opaque state,
   wherein the display panel sequentially displays a first field comprising (N×k−(N−1)) sequence data of first through Nth visual region images, a second field comprising (N×k−(N−2)) sequence data of first through Nth visual region images, . . . , and a Nth field comprising (N×k−

(N–N)) sequence data of first through Nth visual region images, where k is any one of 1, 2, or 3.

10. The apparatus of claim 9, wherein a pitch between the plurality of cells measured in a horizontal direction is no more than about 1/N of a pitch between the lenticular lenses.

11. The apparatus of claim 9, wherein each of the plurality of lenticular lenses corresponds to N vertical lines of pixel units.

12. The apparatus of claim 9, wherein the spatial optical modulator is a liquid crystal display panel.

13. The apparatus of claim 12, wherein a substrate of the liquid crystal display panel is a flexible substrate.

14. The apparatus of claim 13, wherein the flexible substrate is formed of any one selected from polyimide, polyethersulfone, polyethyleneterephtalate, and resin.

15. The apparatus of claim 9, wherein the display element is a self-emissive display element.

16. The apparatus of claim 9, wherein the display element is a non-emissive display element, and the display panel further comprises a backlight unit disposed at a rear of the display panel.

* * * * *